(12) United States Patent
Tanizaki et al.

(10) Patent No.: US 10,379,788 B2
(45) Date of Patent: Aug. 13, 2019

(54) OPERATION DEVICE CONFIGURED TO DISPLAY A CONFIGURATION OF AN IMAGE FORMING DEVICE AND INFORMATION PROCESSING SYSTEM INCLUDING SAME

(71) Applicants: Tomoya Tanizaki, Tokyo (JP); Toshifumi Shobu, Kanagawa (JP)

(72) Inventors: Tomoya Tanizaki, Tokyo (JP); Toshifumi Shobu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/618,720

(22) Filed: Jun. 9, 2017

(65) Prior Publication Data
US 2017/0357468 A1 Dec. 14, 2017

(30) Foreign Application Priority Data

Jun. 10, 2016 (JP) .................. 2016-116443
Jun. 6, 2017 (JP) .................. 2017-112002

(51) Int. Cl.
*G06F 3/12* (2006.01)
*G06F 3/041* (2006.01)
*H04N 1/00* (2006.01)

(52) U.S. Cl.
CPC .......... *G06F 3/1204* (2013.01); *G06F 3/0412* (2013.01); *G06F 3/1229* (2013.01);
(Continued)

(58) Field of Classification Search
CPC .... G06F 3/1204; G06F 3/1253; G06F 3/1254; G06F 3/1257
See application file for complete search history.

(56) References Cited

U.S. PATENT DOCUMENTS

2008/0062461 A1* 3/2008 Shiono .................. G06F 3/1203 358/1.15
2014/0111821 A1* 4/2014 Seo ..................... H04N 1/00204 358/1.13
(Continued)

FOREIGN PATENT DOCUMENTS

JP 8-180175 7/1996
JP 2001-092947 4/2001
(Continued)

*Primary Examiner* — Benjamin O Dulaney
(74) *Attorney, Agent, or Firm* — Harness, Dickey & Pierce, P.L.C.

(57) ABSTRACT

An information processing system includes a first device and a second device that allows a user to operate the first device via the second device. The information processing system includes a processor and a memory to store a plurality of instructions. When executed by the processor, the plurality of instructions cause the processor to store, in the memory, apparatus configuration image element information regarding one or more elements of an apparatus configuration image of the first device, structure the apparatus configuration image using the apparatus configuration image element information, the apparatus configuration image indicating a configuration of the first device, and in response to execution of an application program on the second device, control a display to display an image based on the apparatus configuration image.

18 Claims, 19 Drawing Sheets

(52) U.S. Cl.
CPC .......... *G06F 3/1257* (2013.01); *G06F 3/1258* (2013.01); *G06F 3/1285* (2013.01); *H04N 1/00225* (2013.01)

(56) References Cited

U.S. PATENT DOCUMENTS

| | | | |
|---|---|---|---|
| 2014/0211254 A1* | 7/2014 | Takeuchi | G06F 3/126 358/1.15 |
| 2015/0153972 A1* | 6/2015 | Oba | G06F 3/1221 358/1.14 |
| 2015/0153977 A1* | 6/2015 | Tanaka | G06F 3/1229 358/1.14 |
| 2015/0338815 A1* | 11/2015 | Tanaka | G03G 15/70 399/21 |
| 2016/0090259 A1* | 3/2016 | Koda | B65H 29/00 700/213 |
| 2016/0150115 A1 | 5/2016 | Shibukawa et al. | |

FOREIGN PATENT DOCUMENTS

| | | |
|---|---|---|
| JP | 2004-040499 | 2/2004 |
| JP | 2009-054003 | 3/2009 |
| JP | 2011-034453 | 2/2011 |

\* cited by examiner

FIG. 4AB

| Job list [9999] | | | Server job | Main body job |
|---|---|---|---|---|
| Status | No. | User_Name | File_Name | Document Setting |
| Printing | 0001 | User_Name000000000000000000000000 | Job_Name000000000000000000000000 | 99999 | 99999 |
| | 0002 | User_Name000000000000000000000000 | Job_Name000000000000000000000000 | 99999 | 99999 |
| | 0003 | User_Name000000000000000000000000 | Job_Name000000000000000000000000 | 99999 | 99999 |
| | 0004 | User_Name000000000000000000000000 | Job_Name000000000000000000000000 | 99999 | 99999 |
| | 0005 | User_Name000000000000000000000000 | Job_Name000000000000000000000000 | 99999 | 99999 |

(2)

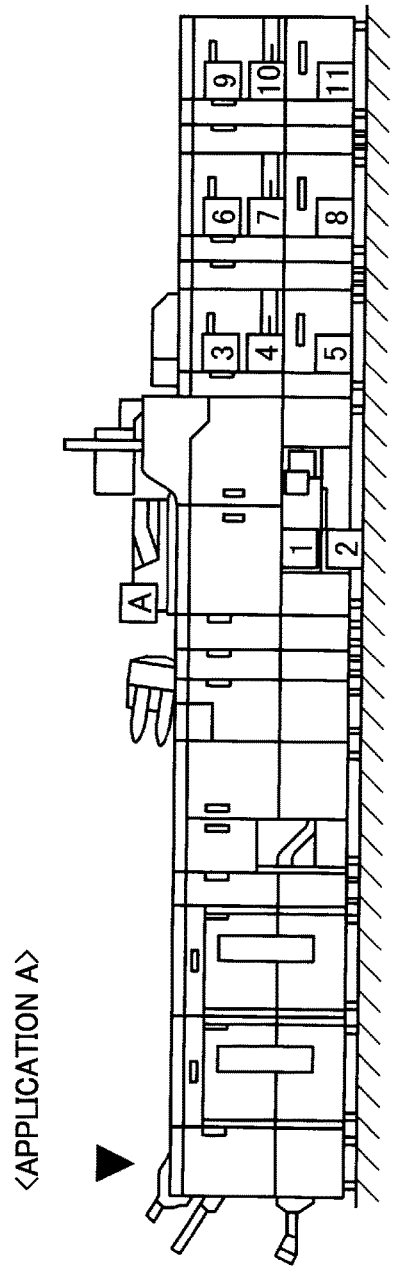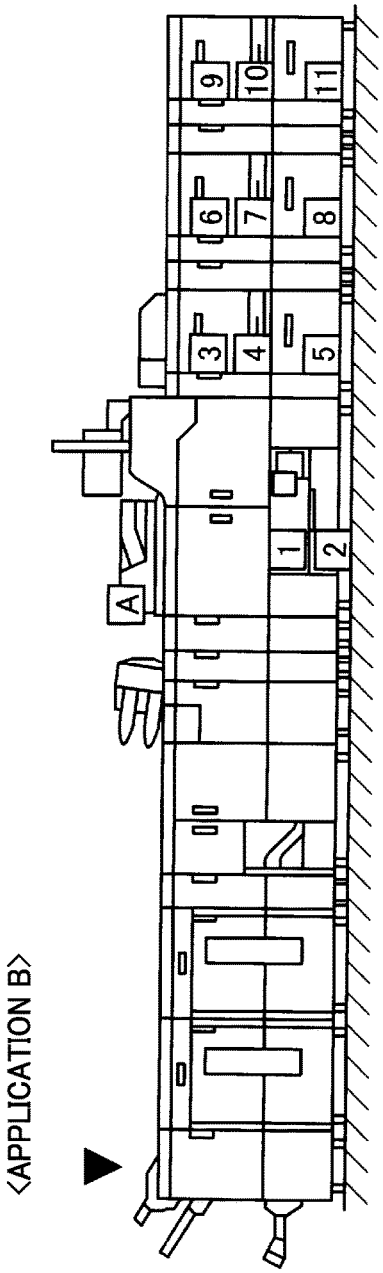

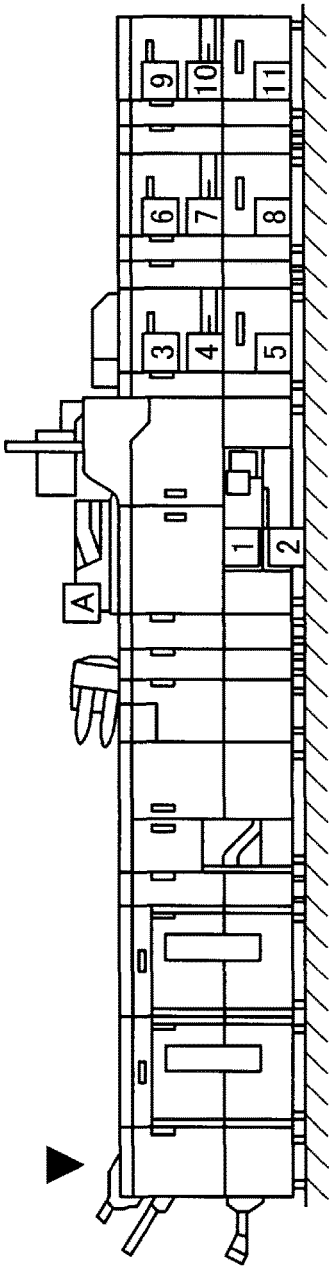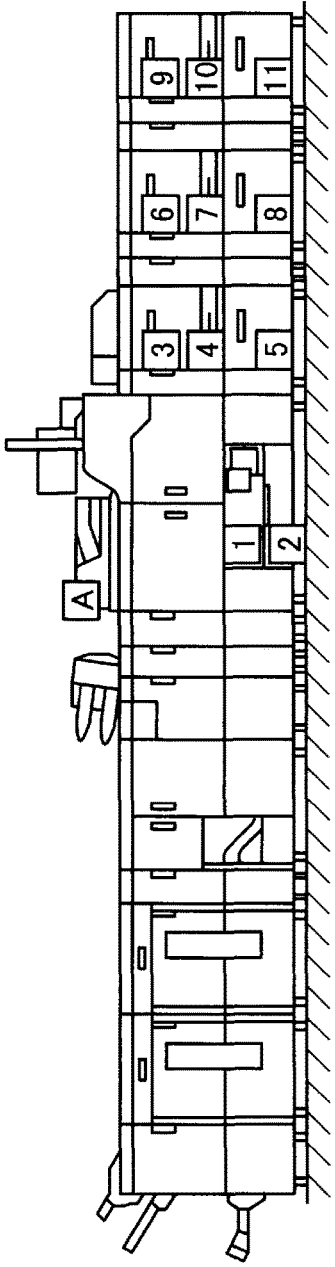

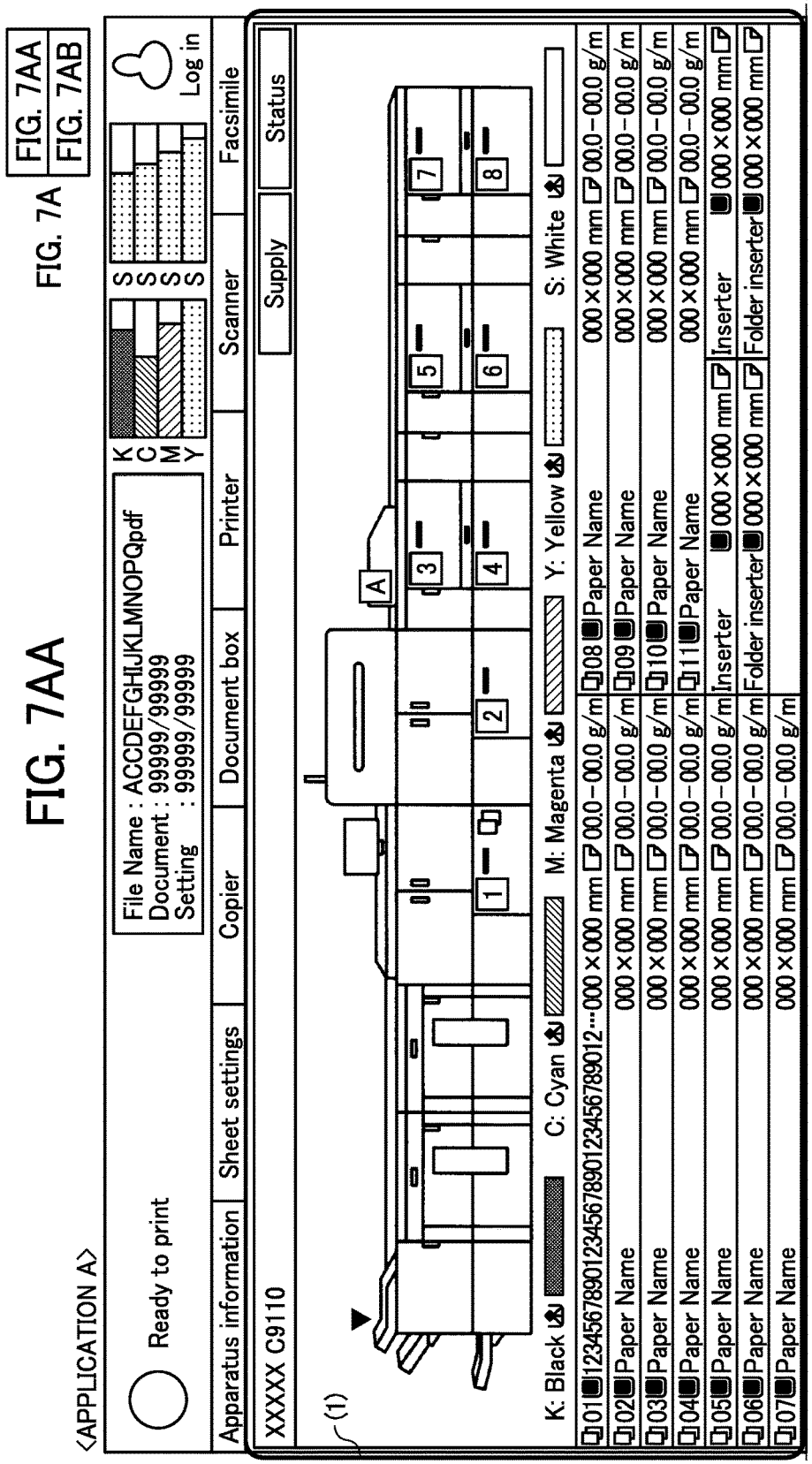

FIG. 7AB

| Job list [9999] | | | Server job | Main body job |
|---|---|---|---|---|
| Status | No. | User_Name | File_Name | Document Setting |
| Printing | 0001 | User_Name0000000000000000 | Job_Name0000000000000000 99999 | 99999 |
| 001 | 0002 | User_Name0000000000000000 | Job_Name0000000000000000 99999 | 99999 |
| 002 | 0003 | User_Name0000000000000000 | Job_Name0000000000000000 99999 | 99999 |
| 003 | 0004 | User_Name0000000000000000 | Job_Name0000000000000000 99999 | 99999 |
| 004 | 0005 | User_Name0000000000000000 | Job_Name0000000000000000 99999 | 99999 |

<APPLICATION A>: COPIER: ERROR IS DISPLAYED

COVER IS OPEN.
PRESS STATE CHECK BUTTON OF
OPERATION DEVICE

<APPLICATION B>: SCANNER: ERROR IS NOT DISPLAYED

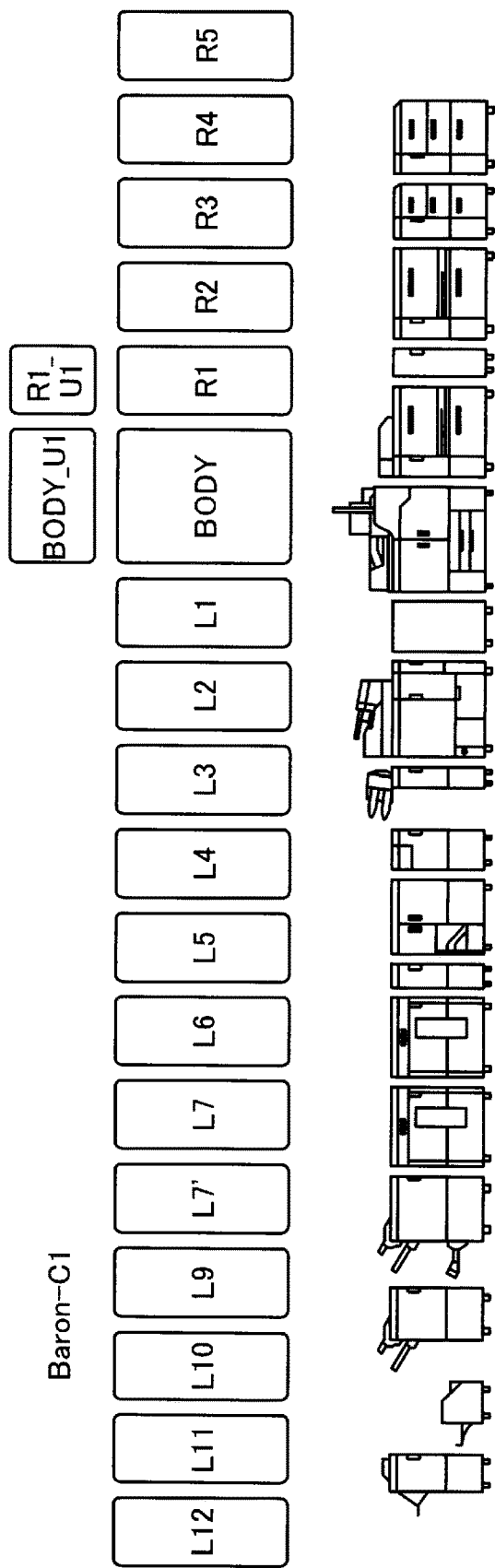

OPERATION DEVICE CONFIGURED TO DISPLAY A CONFIGURATION OF AN IMAGE FORMING DEVICE AND INFORMATION PROCESSING SYSTEM INCLUDING SAME

CROSS-REFERENCE TO RELATED APPLICATIONS

This patent application is based on and claims priority pursuant to 35 U.S.C. § 119(a) to Japanese Patent Application Nos. 2016-116443, filed on Jun. 10, 2016 and 2017-112002, filed on Jun. 6, 2017, in the Japan Patent Office, the entire disclosure of which are hereby incorporated by reference herein.

BACKGROUND

Technical Field

Embodiments of the present disclosure relate to an information processing system, and an operation device.

Description of the Related Art

A technique of displaying an image of apparatus configuration information with an operation device connected to an image forming apparatus is known. More specifically, the operation device implements various types of application programs to use various types of functions of the image forming apparatus. When implementing the application program, the operation device may display the image of the apparatus configuration information. By executing such an application program, necessary elements for the apparatus configuration are acquired according to a corresponding role of the application program and the image of the apparatus configuration is generated. The operation device, accordingly, displays information including the apparatus configuration image generated by the application program.

SUMMARY

An information processing system includes a first device and a second device that allows a user to operate the first device via the second device. The information processing system includes a processor and a memory to store a plurality of instructions. When executed by the processor, the plurality of instructions cause the processor to store, in the memory, apparatus configuration image element information regarding one or more elements of an apparatus configuration image of the first device, structure the apparatus configuration image using the apparatus configuration image element information, the apparatus configuration image indicating a configuration of the first device, and in response to execution of an application program on the second device, control a display to display an image based on the apparatus configuration image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings; wherein

FIG. 5A and FIG. 5B are example illustrations of the apparatus configuration images displayed based on applications executed substantially concurrently according to the first embodiment;

FIG. 6A and FIG. 6B are example illustrations of the apparatus configuration image to which an option of whether or not to display sheet ejection information is reflected according to the first embodiment;

FIG. 13 is an illustration of elements and corresponding units for explaining how the elements of the apparatus configuration image are managed, according to the first embodiment;

DETAILED DESCRIPTION

Figure 1:
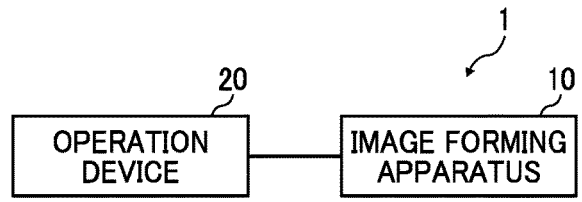
FIG. 1 is a diagram illustrating an example of configuration of an image processing system according to a first embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

The embodiments of the present disclosure relate to an information processing system and an operation device are described with reference to drawings below. The embodiments, however, are not intended to be limiting of the present disclosure.

First Embodiment

System Configuration

FIG. 1 is a diagram illustrating an example of a system configuration of an information processing system 1 according to a first embodiment. The information processing system 1, which includes an apparatus and an operation device, displays an image of configuration information of the apparatus on the operation device connected to the apparatus. As an example of the apparatus according to the embodiment, an image forming apparatus, such as a multi function peripheral (MFP), is used in the description.

Referring to FIG. 1, the information processing system 1 includes an image forming apparatus 10 and an operation device 20. The image forming apparatus 10 performs various types of image processing. The operation device 20 is a general-purpose operation device for operating the image forming apparatus 10. The image forming apparatus 10 and the operation device 20 may communicate with each other via a connection due to a universal serial bus (USB), a wireless local area network (LAN), or the like.

The operation device 20 is installed with a plurality of application programs to use functions of the image forming apparatus 10 in the above-mentioned configuration. A user can use the functions of the image forming apparatus 10 by operating the operation device 20 to execute the application programs. The image forming apparatus 10 performs a corresponding function according to the execution of each application program.

In executing some types of application programs, an apparatus configuration image that is an image of configuration information of the image forming apparatus 10 is displayed on the operation device 20. According to the present embodiment, the apparatus configuration image is not structured every time the application program is executed. More specifically, the operation device 20 receives apparatus configuration image element information in association with elements of the apparatus configuration image from the image forming apparatus 10 at any desired time during start-up of the image forming apparatus 10 and structures the apparatus configuration image using the elements. After that, when receiving a request to acquire, or an acquisition request for, the apparatus configuration image according to the execution of the application program, the operation device 20 provides the structured apparatus configuration image to the application program.

The operation device 20, accordingly, does not require redundant processing to structure the apparatus configuration image to be used for each application program at each time the application program is executed, resulting in reduction in a processing load of the operation device 20.

Hardware Configuration

Figure 2:
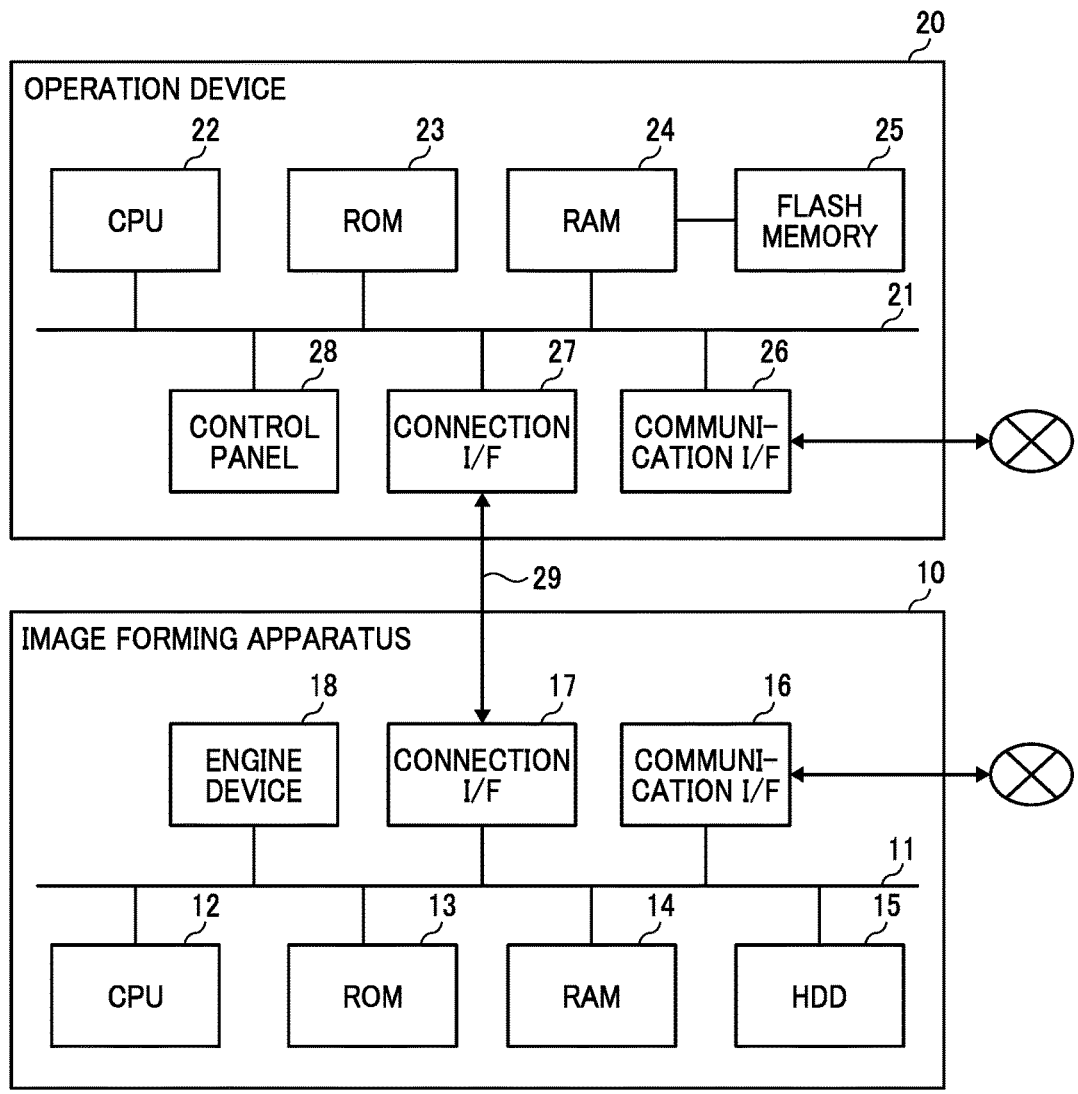
FIG. 2 is a block diagram illustrating a hardware configuration of the system illustrated in FIG. 1 according to the first embodiment.

A hardware configuration of the hardware configurations of the operation device 20 and the image forming apparatus 10, according to the first embodiment, is described below with reference to FIG. 2. FIG. 2 is a block diagram illustrating the hardware configurations of the operation device 20 and the image forming apparatus 10 according to the first embodiment.

Referring to FIG. 2, the image forming apparatus 10 includes a central processing unit (CPU) 12, a read only memory (ROM) 13, a random access memory (RAM) 14, a hard disk drive (HDD) 15, a communication interface (I/F) 16, a connection I/F 17, and an engine device 18. The above-mentioned components are connected to each other through a system bus 11.

The CPU 12 controls the entire operation of the image forming apparatus 10. The CPU 12 controls the entire operation of the image forming apparatus 10 by executing a program stored in the ROM 13 or the HDD 15 using the RAM 14 as a work area. The HDD 15 is a nonvolatile recording medium. The HDD 15 stores various types of programs executed by the CPU 12 and various types of data. For example, such programs include an operating system (OS) that controls the image forming apparatus 10 as a whole, firmware, and one or more application programs.

The communication I/F 16 is an interface via a wireless connection. The communication I/F 16 is, for example, an interface that communicates with an external apparatus including the operation device 20 and a client personal computer (PC) via a network. The connection I/F 17 is an interface that uses a wired connection. The connection I/F 17 is, for example, an interface that communicates with the operation device 20 through a communication path 29. As described above, the connection I/F 17 is a USB standard interface. The engine device 18 is an image processing engine that implements functions related to the image processing, including functions as a printer, a scanner, and a copier.

As illustrated in FIG. 2, the operation device 20 includes a CPU 22, a ROM 23, a RAM 24, a flash memory 25, a communication I/F 26, a connection I/F 27, and a control panel 28. The above-mentioned components are connected to each other through a system bus 21.

The CPU 22 controls the entire operation of the operation device 20. The CPU 22 controls the entire operation of the operation device 20 by executing a program stored in the ROM 23 or the flash memory 25 using the RAM 24 as a work area. The flash memory 25 is a nonvolatile recording medium. The flash memory 25 stores various types of programs executed by the CPU 22 and various types of data. For example, the programs include an OS, which is different from the OS of the image forming apparatus 10, to control the operation device 20 as a whole, firmware, and one or more application programs.

The communication I/F 26 is an interface for a wireless connection. The communication I/F 26 is, for example, an interface that communicates with an external apparatus including the image forming apparatus 10 and a web server via a network. The connection I/F 27 is an interface for a wired connection. The connection I/F 27 is, for example, an interface that communicates with the image forming apparatus 10 through the communication path 29. As described above, the connection I/F 27 is the USB standard interface. The control panel 28 accepts instruction operations from the user for performing various operations and settings. The control panel 28 also displays, for example, operational and setting conditions of the image forming apparatus 10. The control panel 28 includes a liquid crystal display (LCD) implementing a touch panel function and an electro luminescence display device.

Functional Configuration

Figure 3:
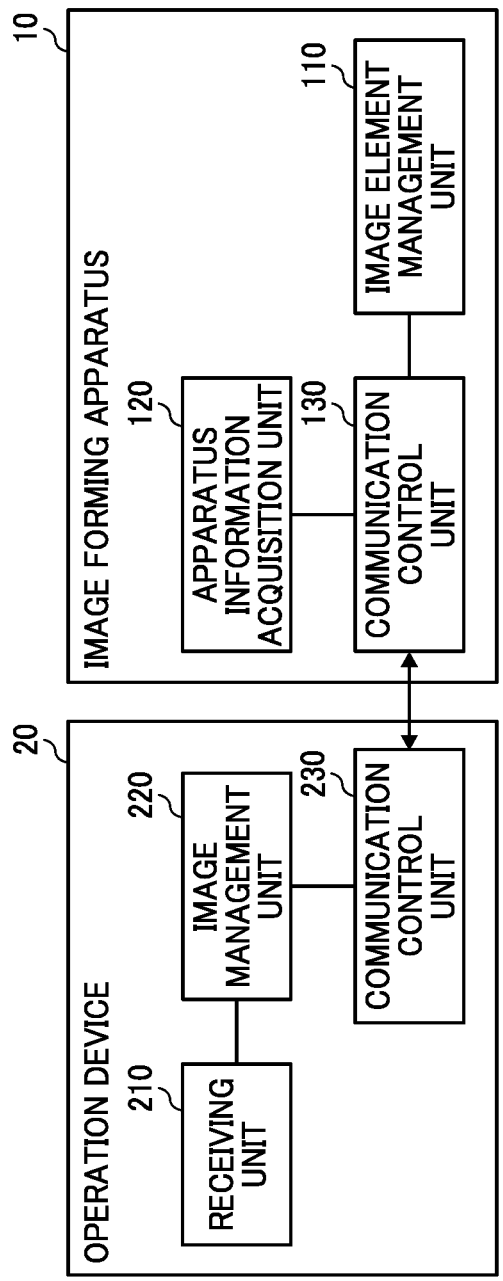
FIG. 3 is a block diagram illustrating a functional configuration of devices according to the first embodiment.

A functional configuration of the functional configurations of the operation device 20 and the image forming apparatus 10, according to the first embodiment, is described below with reference to FIG. 3. FIG. 3 is a block diagram illustrating an example of functional configurations of the operation device 20 and the image forming apparatus 10, according to the first embodiment. Hereinafter, an application program that is executed to use a corresponding function of the image forming apparatus 10 may be referred to as, simply, an application.

Referring to FIG. 3, the operation device 20 includes a receiving unit 210, an image management unit 220, and a communication control unit 230. A part of or all of the above-mentioned units may be implemented with software or hardware. The communication control unit 230 has a function of controlling wired communication between the operation device 20 and the image forming apparatus 10 via the connection I/F 27.

The receiving unit 210 receives the request to acquire the apparatus configuration image, which is an image indicating an apparatus configuration, according to the application executed by the operation device 20. This request may be referred to as an acquisition request. More specifically, if the application, which is executed in response to user's operation to the operation device 20, uses the apparatus configuration image, the receiving unit 210 receives the acquisition request for the apparatus configuration image of the image forming apparatus 10 from the application.

The image management unit 220 provides the apparatus configuration image according to the acquisition request. More specifically, the image management unit 220 obtains the apparatus configuration image element information from the image forming apparatus 10 via the communication control unit 230 at any desired time during the start-up of the image forming apparatus 10. Subsequently, the image management unit 220 structures the apparatus configuration image based on the obtained apparatus configuration image element information and stores and manages the apparatus configuration image. The image management unit 220 provides the structured apparatus configuration image, which is stored and managed by the image management unit 220, for the application being executed, when the receiving unit 210 receives the acquisition request.

The apparatus configuration image element information includes unit connection information, unit image information, and active part icon information. Here, the image forming apparatus 10 is configured with units and each unit is assigned with a unit identification (ID). The unit connection information indicates a connecting position between units of the image forming apparatus 10. The unit image information includes information regarding image data and an image size of each unit. As the information regarding image data, the unit image information may include an address where the image data of each unit is stored, or a name of the image data file being stored, for example, as described below. The active part icon information is related to a part, such as a tray, that transitions between an active state and an inactive state according to the operation of the image forming apparatus 10. Here, the part is referred to as an active part regardless of its state. The active part is in use, or operating, in the active state and is not in use, or not operating, in the inactive state. The active part icon information includes information regarding image data (such as an address where the image data is stored) and an image size of the active part.

Table 1 illustrated below is an example of the unit connection information according to the embodiment.

TABLE 1

Unit Connection Information

| Unit ID | Position Number |
|---|---|
| UNIT_ID_ALASKA | R5 |
| UNIT_ID_SIBERIA | R4 |
| UNIT_ID_ANATOLIA2 | R3 |
| UNIT_ID_ANATOLIA_CONNECT_UNIT | R2 |
| UNIT_ID_ANATOLIA1 | R1 |
| UNIT_ID_ALEUTIAN | R1_U1 |
| UNIT_ID_BODY | BODY |
| UNIT_ID_SINAI | BODY_U1 |
| UNIT_ID_CANAL | L1 |
| UNIT_ID_TENRYU | L2 |
| UNIT_ID_INSERTER | L3 |
| UNIT_ID_DONAU | L4 |
| UNIT_ID_ISHIKARI | L5 |
| UNIT_ID_SPARTA | L6 |
| UNIT_ID_LOIRE1 | L7 |
| UNIT_ID_LOIRE2 | L8 |
| UNIT_ID_COLUMBIA | L9 |
| UNIT_ID_COLUMBIA_SADDLE | L10 |
| UNIT_ID_SHINJIKO | L11 |
| UNIT_ID_PLOCKMATIC | L12 |

The unit connection information includes the unit ID for each unit and a position number corresponding to the unit ID. The position number indicates a location in the apparatus configuration image as illustrated in FIG. 13.

Table 2 illustrated below is an example of the unit image information.

TABLE 2

Unit Image Information

| Unit ID | Image ID (Unit Image) | Width | Height | First Connection Span | Second Connection Span |
|---|---|---|---|---|---|
| UNIT_ID_ALASKA | unit_image_alaska.png | 70 | 132 | 70 | 132 |
| UNIT_ID_SIBERIA | unit_image_siberia.png | 99 | 132 | 99 | 132 |
| UNIT_ID_ANATOLIA2 | unit_image_anatolia2.png | 125 | 132 | 125 | 132 |
| UNIT_ID_ANATOLIA_CONNECT_UNIT | unit_image_anatolia_connect_unit.png | 40 | 32 | 40 | 32 |
| UNIT_ID_ANATOLIA1 | unit_image_anatolia1.png | 125 | 132 | 125 | 132 |
| UNIT_ID_ALEUTIAN | unit_image_aleutian.png | 89 | 73 | 89 | 73 |
| UNIT_ID_BODY | unit_image_body.png | 143 | 205 | 143 | 132 |
| UNIT_ID_SINAI | unit_image_sinai.png | 85 | 70 | 85 | 70 |
| UNIT_ID_CANAL | unit_image_canal.png | 72 | 132 | 72 | 132 |
| UNIT_ID_TENRYU | unit_image_tenryu.png | 132 | 205 | 132 | 205 |
| UNIT_ID_INSERTER | unit_image_inserter.png | 88 | 178 | 29 | 178 |
| UNIT_ID_DONAU | unit_image_donau.png | 59 | 132 | 59 | 132 |

TABLE 2-continued

Unit Image Information

| Unit ID | Image ID (Unit Image) | Width | Height | First Connection Span | Second Connection Span |
|---|---|---|---|---|---|
| UNIT_ID_ISHIKARI | unit_image_ishikari.png | 107 | 132 | 107 | 132 |
| UNIT_ID_SPARTA | unit_image_sparta.png | 34 | 121 | 34 | 121 |
| UNIT_ID_LOIRE1 | unit_image_loire1.png | 107 | 132 | 107 | 132 |
| UNIT_ID_LOIRE2 | unit_image_loire2.png | 107 | 132 | 107 | 132 |
| UNIT_ID_COLUMBIA | unit_image_columbia.png | 122 | 149 | 122 | 149 |
| UNIT_ID_COLUMBIA_SADDLE | unit_image_columbia_saddle.png | 122 | 149 | 122 | 149 |
| UNIT_ID_SHINJIKO | unit_image_shinjiko.png | 89 | 67 | 89 | 67 |
| UNIT_ID_PLOCKMATIC | unit_image_plockmatic.png | 81 | 140 | 81 | 140 |

Figure 15B:
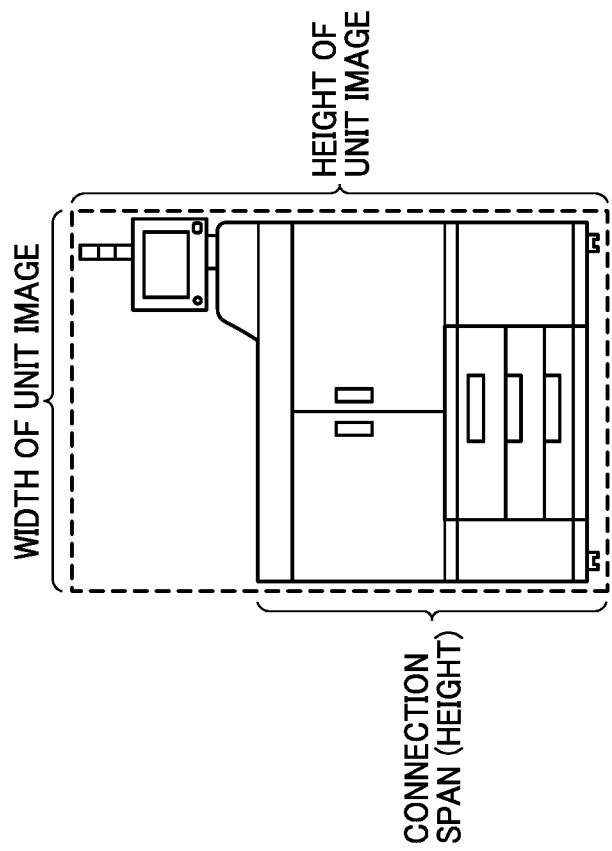
FIG. 15A and FIG. 15B are illustrations of examples of unit images.
Figure 15A:
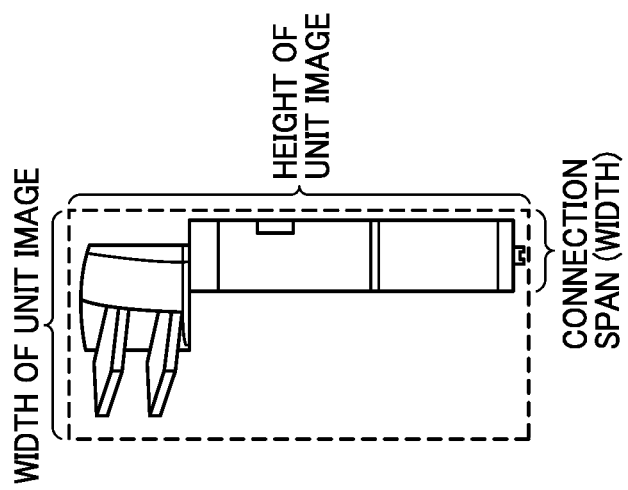

The unit image information includes the unit ID for each unit, an image ID corresponding to each unit ID to identify image data of a unit image of each unit. The image ID may be a file name of the unit image. The unit image information also includes a width of the unit image, a height of the unit image, a first connection span (width) that indicates a span from one of connection positions with other units on both sides, to the other one of the connection positions, and a second connection span (height) that indicates a span from the bottom to the top of the unit. The first connection span and the second connection span are required to display each unit in the apparatus configuration image. FIG. 15A and FIG. 15B are illustrations of examples of the unit. Definitions of the width and the height of the unit image and the first connection span and the second connection span are also illustrated in FIG. 15A and FIG. 15B.

Table 3 illustrated below is an example of the active part icon information according to the embodiment.

TABLE 3

Active Image Icon Information

| Active Part ID | Unit ID | Image ID (Image of Active Part Icon) | Width | Height | Position Coordinate (X) | Position Coordinate (Y) |
|---|---|---|---|---|---|---|
| tray A | UNIT_ID_ALEUTIAN | tray_active_trayA_aleutian.png | 82 | 19 | 0 | 0 |
| tray 1 | UNIT_ID_BODY | tray_active_tray1_body.png | 75 | 25 | 26 | 38 |
| tray 2 | UNIT_ID_BODY | tray_active_tray2_body.png | 75 | 14 | 26 | 23 |
| tray 3 | UNIT_ID_BODY | tray_active_tray3_body.png | 75 | 16 | 26 | 6 |
| tray 4 | UNIT_ID_ALASKA | tray_active_tray4_alaska.png | 42 | 28 | 27 | 92 |
| tray 5 | UNIT_ID_ALASKA | tray_active_tray5_alaska.png | 42 | 30 | 27 | 61 |
| tray 6 | UNIT_ID_ALASKA | tray_active_tray6_alaska.png | 42 | 54 | 27 | 6 |
| tray 4 | UNIT_ID_SIBERIA | tray_active_tray4_siberia.png | 71 | 28 | 27 | 92 |
| tray 5 | UNIT_ID_SIBERIA | tray_active_tray5_siberia.png | 71 | 30 | 27 | 61 |
| tray 6 | UNIT_ID_SIBERIA | tray_active_tray6_siberia.png | 71 | 35 | 27 | 6 |
| inserter 1 | UNIT_ID_2INSERTER | tray_active_inserter1_2inserter.png | 54 | 17 | 0 | 154 |
| inserter 2 | UNIT_ID_2INSERTER | tray_active_inserter2_2inserter.png | 54 | 17 | 0 | 132 |
| perfect_bind_inserter 1 | UNIT_ID_TENRYU | tray_active_perfect_bind_inserter1_tenryu.png | 73 | 16 | 0 | 168 |
| perfect_bind_inserter 2 | UNIT_ID_TENRYU | tray_active_perfect_bind_inserter2_tenryu.png | 73 | 20 | 0 | 153 |
| proof | UNIT_ID_COLUMBIA | tray_active_proof_columbia.png | 20 | 20 | 32 | 99 |
| shift | UNIT_ID_COLUMBIA | tray_active_shift_columbia.png | 20 | 20 | 9 | 71 |
| proof | UNIT_ID_COLUMBIA_SADDLE | tray_active_proof_columbia_saddle.png | 20 | 20 | 32 | 99 |
| shift | UNIT_ID_COLUMBIA_SADDLE | tray_active_shift_columbia_saddle.png | 20 | 20 | 9 | 71 |
| saddle | UNIT_ID_COLUMBIA_SADDLE | tray_active_saddle.columbia_saddle.png | 20 | 20 | 0 | 65 |
| fold | DESIGN_UNIT_ID_DONAU | tray_active_fold_donau.png | 20 | 20 | 5 | 138 |
| ring_bind | DESIGN_UNIT_ID_ISHIKARI | tray_active_ring_bind_ishikari.png | 20 | 20 | 20 | 54 |
| staple | DESIGN_UNIT_ID_PLOCKMATIC | tray_active_staple_plockmatic.png | 20 | 20 | 0 | 43 |
| punch | DESIGN_UNIT_ID_SPARTA | tray_active_punch_sparta.png | 20 | 20 | 7 | 138 |
| perfect_bind | DESIGN_UNIT_ID_TENRYU | tray_active_perfect_bind_tenryu.png | 20 | 20 | 75 | 53 |
| saddle | DESIGN_UNIT_ID_SHINJIKO | tray_active_saddle_shinjiko.png | 20 | 20 | 54 | 7 |

The active part icon information includes the unit ID for each unit, and an active part ID that is an identifier of an active part included in each unit. Each active part ID is stored in association with the corresponding unit ID. The active part icon information also includes an image ID for an image of each active part, namely an active part icon image, a size of the active part icon image, and coordinates (X, Y) that indicate a position of the active part icon image in the unit image. An X coordinate indicates a distance from a point at the bottom left of the unit image to a point at the bottom left of the active part icon image in the X-axis. A Y coordinate indicates a distance from a point at the bottom left of the unit image to a point at the bottom left of the active part icon image in the Y-axis.

According to the application executed, the apparatus configuration image provided from the image management unit 220 based on the above mentioned information, is displayed on the control panel 28 to provide visual information to the user.

There is a situation in which the plurality of applications are executed individually at different times. In this situation, the receiving unit 210 receives the plurality of acquisition requests asynchronously according to the plurality of applications being executed asynchronously. The image management unit 220, accordingly, provides the same apparatus configuration image in response to each of the plurality of acquisition requests received asynchronously.

Figure 4A:
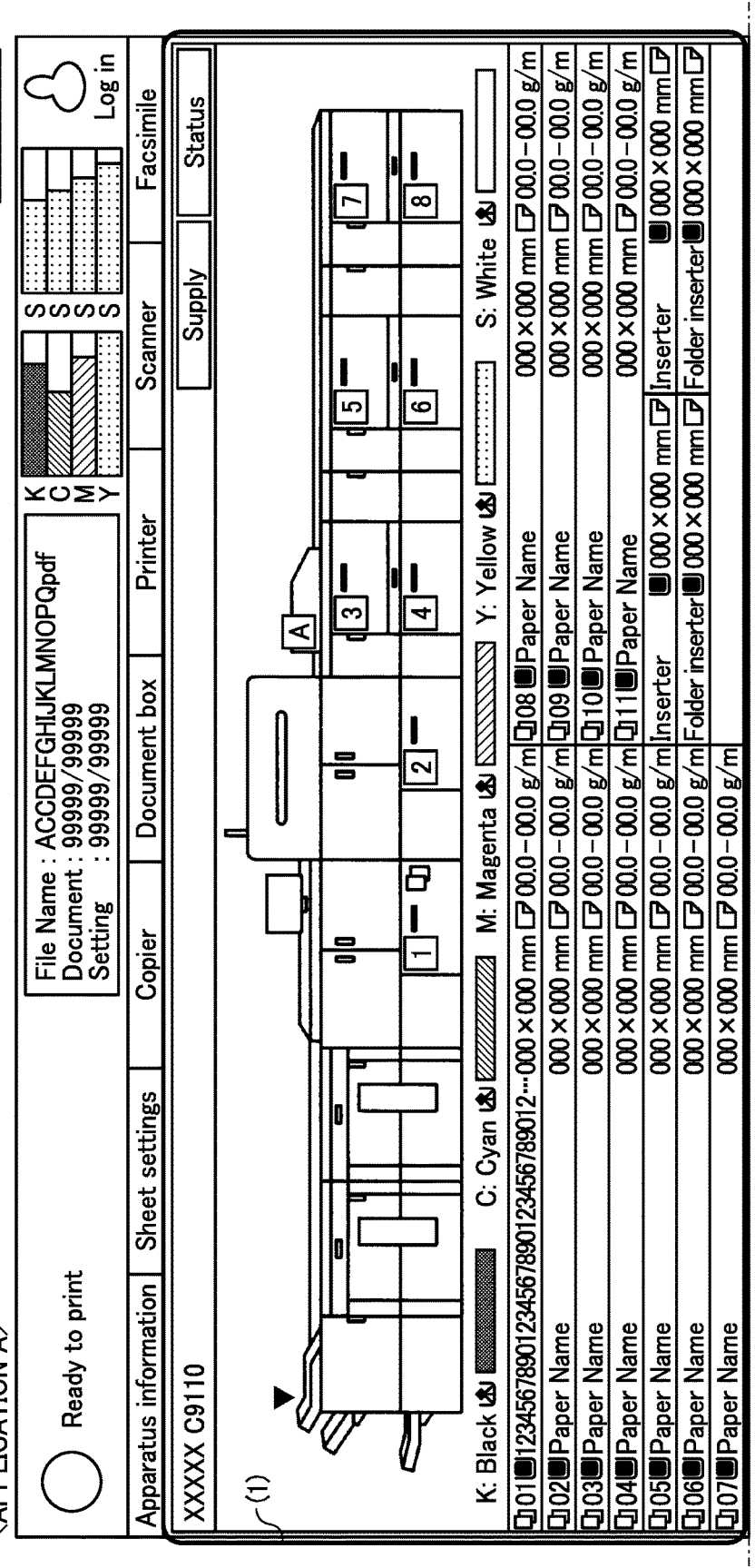
FIG. 4A, which includes FIGS. 4AA and 4AB, and FIG. 4B, which includes FIGS. 4BA and 4BB, are example illustrations of screens displaying apparatus configuration images according to applications individually and asynchronously executed according to the first embodiment.
Figure 4B:
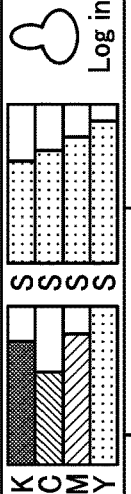
Figure 4B:
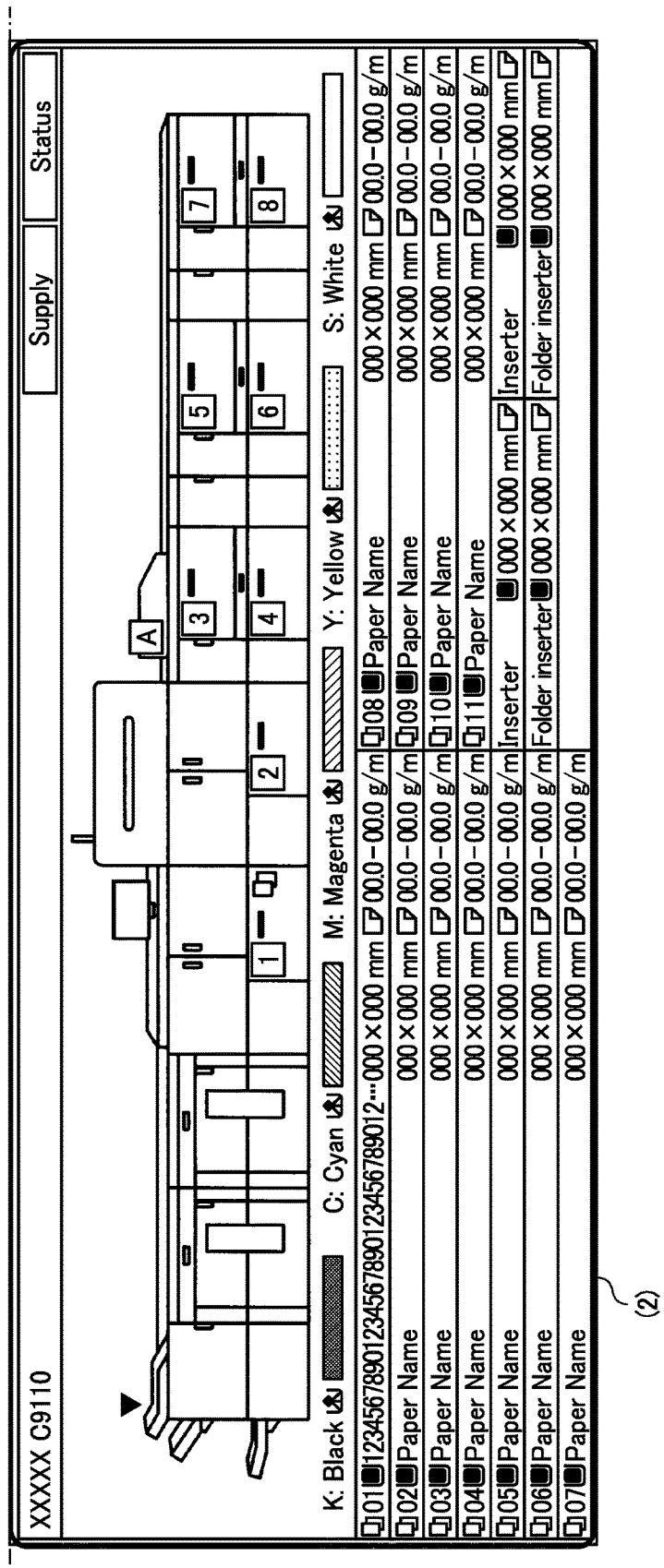

FIG. 4A, which includes 4AA and 4AB, and FIG. 4B, which includes 4BA and 4BB, are example illustrations of screens displaying the apparatus configuration images according to the applications individually and asynchronously executed according to the first embodiment. In FIG. 4A and FIG. 4B, an application A and an application B are executed individually at different times. FIG. 4A illustrates a display screen displayed on the control panel 28 in executing the application A. FIG. 4B illustrates a display screen displayed on the control panel 28 in executing the application B. As illustrated in FIG. 4A and FIG. 4B, the same apparatus configuration image is displayed on each display screen in association with the asynchronous execution of the application A and the application B.

Alternatively, the plurality of applications may be executed substantially at the same time. The receiving unit 210, accordingly, receives the plurality of acquisition requests substantially concurrently according to the plurality of applications executed substantially concurrently in this situation. The image management unit 220, accordingly, provides the same apparatus configuration image in response to each of the plurality of the acquisition requests received substantially at the same time.

In FIG. 4A and FIG. 4B, (1) and (2) indicate display areas. For example, the application A has a screen layout in which the apparatus configuration image is displayed in the display area (1), and the application B has a screen layout in which the apparatus configuration image is displayed in the display area (2). Each application sets and generates such a display area, and then requests to acquire the apparatus configuration image. On receiving the acquisition request, the image management unit 220 performs a rendering process to provide the apparatus configuration image for the application.

FIG. 5A and FIG. 5B are example illustrations of the apparatus configuration images displayed according to the applications executed substantially concurrently, according to the first embodiment. In FIG. 5A and FIG. 5B, the application A and the application B are executed substantially concurrently. As illustrated in FIG. 5A and FIG. 5B, the same apparatus configuration image is individually displayed in association with the concurrent execution of the application A and the application B. Additionally, update information (triangle shaped object), which may be blinking, may also be included in each image for the application A and the application B.

In addition, the application can add various options for displaying the apparatus configuration image. The receiving unit 210, accordingly, receives the acquisition request having option information in relation to the apparatus configuration image. The image management unit 220 provides the apparatus configuration image based on the option information included in the acquisition request. For example, the options are whether or not to display sheet feeding information of the image forming apparatus 10 and whether or not to display sheet ejection information of the image forming apparatus 10. The user selects whether or not to display the sheet feeding information and the sheet ejection information in executing the application. The receiving unit 210, accordingly, receives the acquisition request having the option information indicating whether or not to display the sheet feeding information and the sheet ejection information of the image forming apparatus 10. The image management unit 220, then, reflects whether or not to display the sheet feeding information and the sheet ejection information to the apparatus configuration image and provides the apparatus configuration image.

FIG. 6A and FIG. 6B are example illustrations of the apparatus configuration image reflecting to which the option of whether or not to display sheet ejection information, according to the first embodiment. In FIG. 6A, the sheet ejection information is displayed with the application A, and in FIG. 6B, the sheet ejection information is not displayed with the application B. As illustrated in FIG. 6A, the sheet ejection information (triangular object) is displayed in the apparatus configuration image in association with the application A, in which displaying the sheet ejection information is selected. Additionally, the sheet ejection information is not displayed in the apparatus configuration image in association with the application B, in which displaying the sheet ejection information is not selected.

Another example of the option for the display of the apparatus configuration image is a size ratio of the apparatus configuration image. The size of the apparatus configuration image varies depending on the screen layout including the apparatus configuration image. The receiving unit 210, accordingly, receives the acquisition request having the option information indicating the size ratio of the apparatus configuration image. The image management unit 220, then, reflects the size ratio in the apparatus configuration image and provides the apparatus configuration image.

Figure 7B:
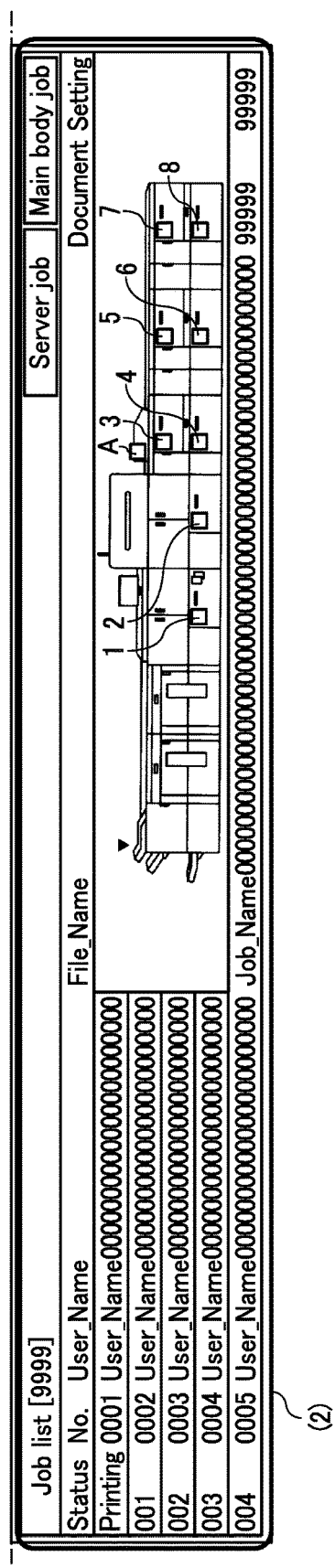
FIG. 7A, which includes 7AA and 7AB, and FIG. 7B, which includes 7BA and 7BB, are example illustrations of the screens displaying the apparatus configuration images to which size ratios are individually reflected, according to the first embodiment.

FIG. 7A, which includes 7AA and 7AB, and FIG. 7B, which includes 7BA and 7BB, are example illustrations of the screens displaying the apparatus configuration images to which the size ratios are individually reflected, according to the first embodiment. In FIG. 7A, the apparatus configuration image reflecting the size ratio according to the screen layout of the application A is illustrated. In FIG. 7B, the apparatus configuration image reflecting the size ratio according to the screen layout of the application B is illustrated. As illustrated in FIG. 7A and FIG. 7B, an area for the apparatus configuration image in the screen layout of the application A is larger than that in the screen layout of the application B. That is, the size ratio of the apparatus configuration image of the application A is large and the size ratio of the apparatus configuration image of the application B is low.

Additionally, still another example of the option for the display of the apparatus configuration image is an error display level of the image forming apparatus 10. The applications are for using the functions of the image forming apparatus 10, and even an error occurs in the image forming apparatus 10, some functions can be used without any problem. Considering this, the user can specify the error display level. The higher the error display level is, the more the error is displayed regardless of the function being used. The error display level can be specified at a time of executing the application or any desired timing. The receiving unit 210, accordingly, receives the acquisition request having the option information indicating the error display level of the image forming apparatus 10 (error information). The image management unit 220, then, reflects the error display corresponding to the error display level to the apparatus configuration image and provides the apparatus configuration image.

Figure 8A:
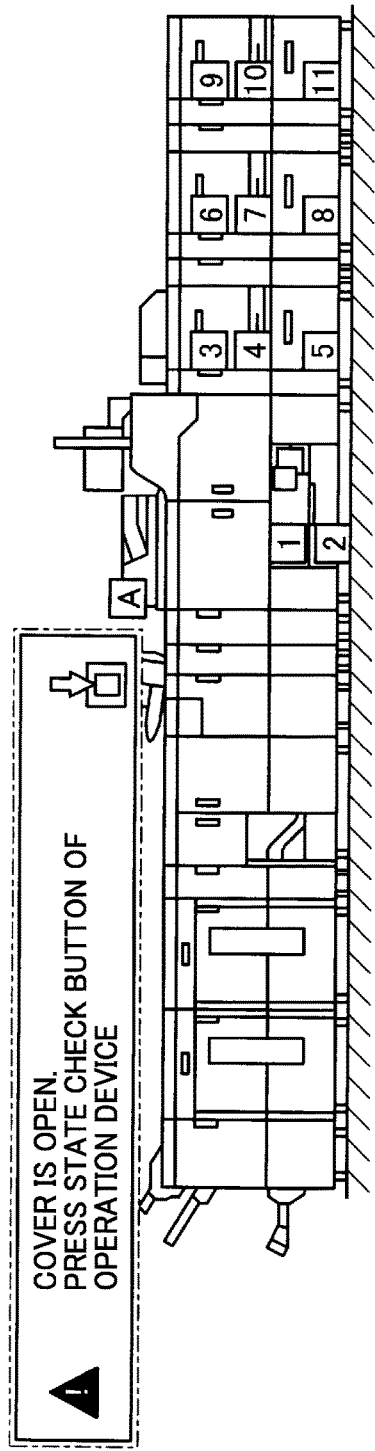
FIG. 8A and FIG. 8B are example illustrations of the apparatus configuration images reflecting the error display level, according to the first embodiment.
Figure 8B:
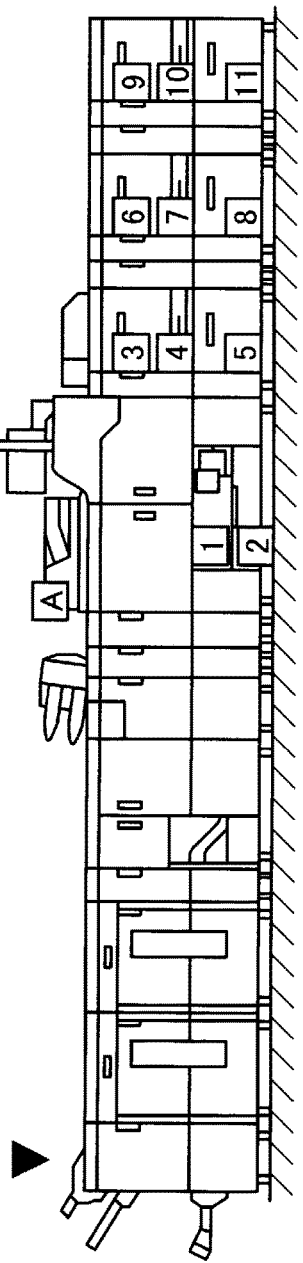

FIG. 8A and FIG. 8B are example illustrations of the apparatus configuration images reflecting the error display level according to the first embodiment. In FIG. 8A, the application A uses a copy function. In FIG. 8B, the application B uses a scan function. In FIGS. 8A and 8B, the error display level is set to a level with which an error display (indication) is displayed when the error occurring causes trouble in the function being used. As illustrated in FIG. 8A, when the application A is executed under a condition where a cover of the image forming apparatus 10 is open, the apparatus configuration image having the error display indicating that the cover is open is displayed, because copying cannot be performed when the cover is open. On the other hand, when the application B is executed under the same condition where the cover is open, the apparatus configuration image having no error display, indicating that the cover is open, is displayed, because scan can be performed even when the cover is open.

Referring back to FIG. 3, the image forming apparatus 10 includes an image element management unit 110, an apparatus information acquisition unit 120, and a communication control unit 130. A part of or all of the above-mentioned units may be implemented with software or hardware. The communication control unit 130 has a function of controlling the wired communication between the operation device 20 and the image forming apparatus 10 via the connection I/F 17.

The image element management unit 110 manages the elements of the apparatus configuration image of the image forming apparatus 10. For example, the image element management unit 110 obtains the apparatus configuration image element information stored in a storage device such as the HDD 15 at a time of starting up of the image forming apparatus 10 or a time of changing of an apparatus configuration of the image forming apparatus 10.

The apparatus information acquisition unit 120 acquires apparatus information of the image forming apparatus 10 stored in the storage device such as the HDD 15. For example, the apparatus information acquisition unit 120 sends the apparatus information including the sheet feeding information and the sheet ejection information, the error information, active part operation state information (active state/inactive state) to the operation device 20. The apparatus information may be included in the acquisition request in executing the application, and managed by the image management unit 220.

Table 4 illustrated below is an example of the active part operation state information.

TABLE 4

Active Part Operation State Information

| Active Part ID | Unit ID | Operation State |
| --- | --- | --- |
| tray A | UNIT_ID_ALEUTIAN | Not operating (inactive) |
| tray 1 | UNIT_ID_BODY | Not operating (inactive) |
| tray 2 | UNIT_ID_BODY | Not operating (inactive) |
| tray 3 | UNIT_ID_BODY | Not operating (inactive) |
| tray 4 | UNIT_ID_ALASKA | Not operating (inactive) |
| tray 5 | UNIT_ID_ALASKA | Not operating (inactive) |
| tray 6 | UNIT_ID_ALASKA | Not operating (inactive) |
| tray 4 | UNIT_ID_SIBERIA | Not operating (inactive) |
| tray 5 | UNIT_ID_SIBERIA | Not operating (inactive) |
| tray 6 | UNIT_ID_SIBERIA | Not operating (inactive) |
| inserter 1 | UNIT_ID_2INSERTER | Not operating (inactive) |
| inserter 2 | UNIT_ID_2INSERTER | Not operating (inactive) |
| perfect_bind_inserter 1 | UNIT_ID_TENRYU | Not operating (inactive) |
| perfect_bind_inserter 2 | UNIT_ID_TENRYU | Operating (active) |
| proof | UNIT_ID_COLUMBIA | Not operating (inactive) |
| shift | UNIT_ID_COLUMBIA | Not operating (inactive) |
| proof | UNIT_ID_COLUMBIA_SADDLE | Not operating (inactive) |
| shift | UNIT_ID_COLUMBIA_SADDLE | Not operating (inactive) |
| saddle | UNIT_ID_COLUMBIA_SADDLE | Not operating (inactive) |
| fold | DESIGN_UNIT_ID_DONAU | Not operating (inactive) |
| ring_bind | DESIGN_UNIT_ID_ISHIKARI | Not operating (inactive) |
| staple | DESIGN_UNIT_ID_PLOCKMATIC | Not operating (inactive) |
| punch | DESIGN_UNIT_ID_SPARTA | Not operating (inactive) |
| perfect_bind | DESIGN_ID_TENRYU | Not operating (inactive) |
| saddle | DESIGN_ID_SHINTJIKO | Not operating (inactive) |

Figure 9:
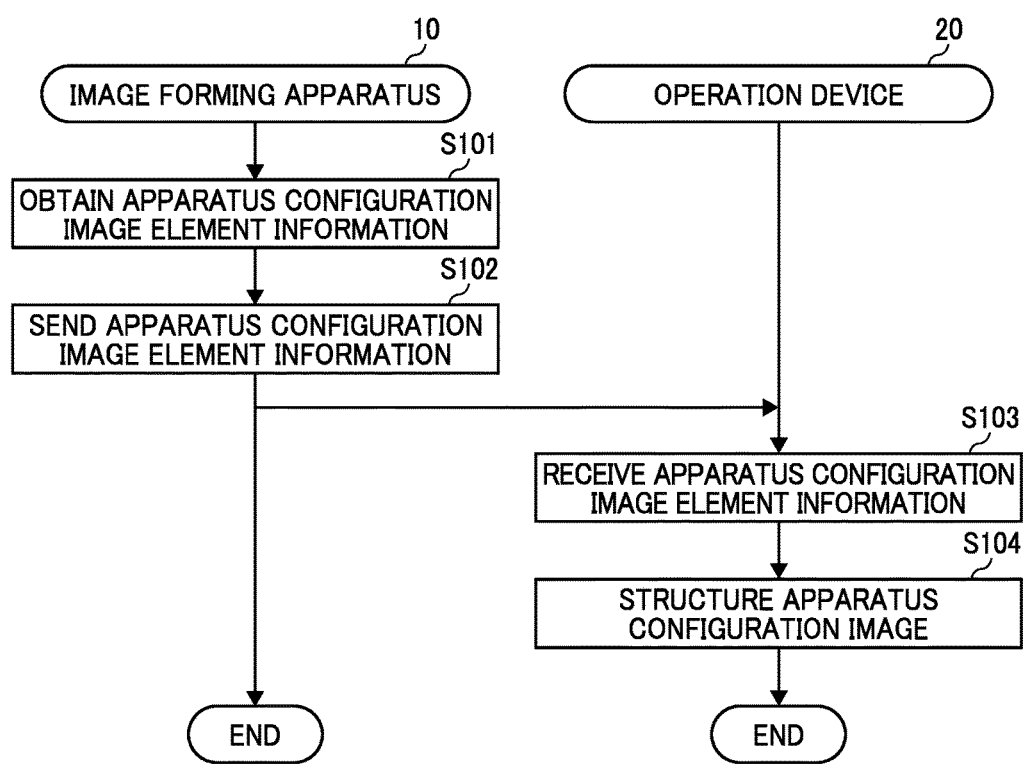
FIG. 9 is a sequence diagram illustrating an example of a process of structuring the apparatus configuration image according to the first embodiment.

Process of Structuring Apparatus Configuration Image According to First Embodiment A process of structuring the apparatus configuration image according to the first embodiment is described below with reference to FIG. 9. FIG. 9 is a sequence diagram illustrating an example of the process of structuring the apparatus configuration image according to the first embodiment.

As illustrated in FIG. 9, the image element management unit 110 of the image forming apparatus 10 obtains the apparatus configuration image element information when the image forming apparatus 10 starts up (S101). The image forming apparatus 10 transfers the obtained apparatus configuration image element information to the operation device 20 using the communication control unit 130 (S102). The communication control unit 230 of the operation device 20 receives the transferred the apparatus configuration image element information from the image forming apparatus 10 (S103). Subsequently, the image management unit 220 of the operation device 20 structures the apparatus configuration image based on the received apparatus configuration image element information.

The image management unit 220 of the operation device 20 forms the apparatus configuration image by combining the unit images in order from the unit assigned with the position number "Body", based on the unit connection information of the apparatus configuration image element information.

More specifically, in the unit connection information of Table 1, the position number of Body is associated with the unit ID of UNIT_ID_BODY. In referring the unit image information of Table 2, the unit ID of UNIT_ID_BODY is associated with the image data having the image ID of unit_image_body.png, so that the image data having the image ID of unit_image_body.png is acquired. The image management unit 220 forms and arranges the unit_image of UNIT_ID_BODY at a corresponding position, which is identified as the position number of Body, in the apparatus configuration image, based on the acquired image data of unit_image_body.png, which is the image data. Similarly, the unit images from the position numbers L1 to L12, which are images of units positioned at the immediate left side of Body to the end in a left direction, are acquired in order to structure the apparatus configuration image. At this time, each unit_image is arranged at a position determined based on the connection span in the unit_image information of Table 2. Similarly, the unit images from the position numbers R1 to R5, which are images of units positioned at the immediate right side of Body to the end in a right direction, are acquired in order to structure the apparatus configuration image. When there is a position number that is not associated with any unit ID, the position identified the position number has no unit connected and the apparatus configuration image is formed without the unit corresponding to the position number.

Additionally, the image management unit 220 refers the active part icon information of Table 2 and the active part operation state information of Table 4 in arranging the image data of each unit in the apparatus configuration image. The image management unit 220 determines whether there is any active parts having an operation state as "operating (active)" in each unit according to the active part operation state information. When there are one or more of active parts being in the active states in the unit to be positioned, the image management unit 220 refers the active part icon information to extract the image data of the image ID corresponding to the active part ID of the active part being in the active state. Subsequently the image management unit 220 draws the active part icon image on the image of the unit based on the information on the position of the active part icon image in the unit image. Then, the image management unit 220 arranges the image data of the unit, on which the active part is drawn, in the apparatus configuration image.

In the example of the active part operation state information of Table 4, a state of the active part ID of proof is "operating", so that the active part image of the active part ID of proof is drawn on the unit image of the unit ID of UNIT_ID_COLUMBIA, when the unit image of the unit ID of UNIT_ID_COLUMBIA, which is corresponding to proof, is arranged in the apparatus configuration image.

Rendering Process According to First Embodiment

Figure 10:
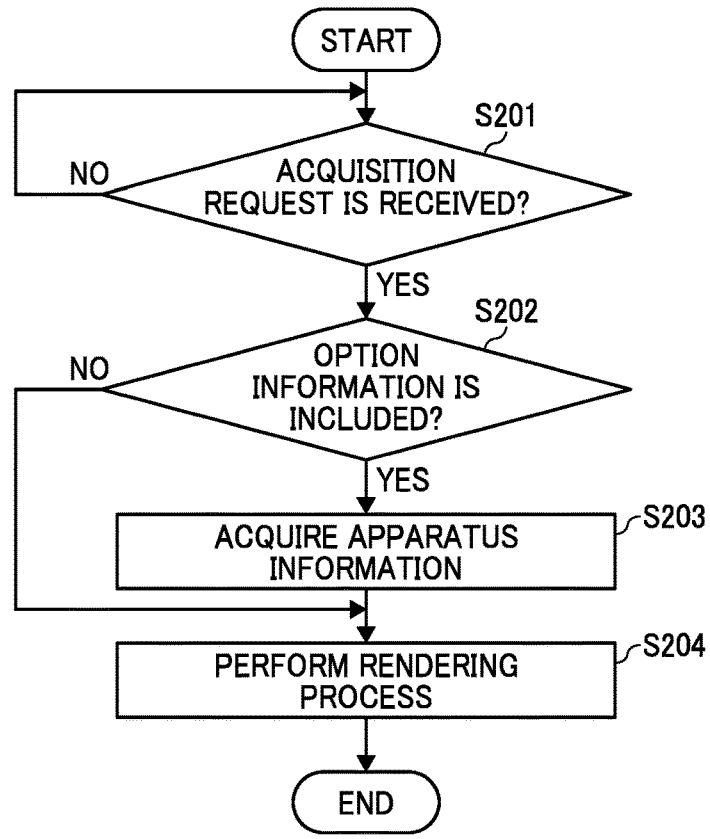
FIG. 10 is a flowchart illustrating an example of a rendering process according to the first embodiment.

A process of rendering is described below with reference to FIG. 10. FIG. 10 is a flowchart illustrating an example of rendering processing according to the first embodiment.

As illustrated FIG. 10, the operation device 20 determines whether or not to receive the acquisition request in response to execution of the application (S201). If the operation device 20 determines that the operation device 20 receives the acquisition request (S201: Yes), the operation device 20 determines whether the option information is included in the acquisition request (S202). On the other hand, if the operation device 20 does not receives the acquisition request (S201: No), the operation device 20 is in a state of waiting for receiving the acquisition request. In S202, if the option information is included in the acquisition request (S202: Yes), the operation device 20 acquires the corresponding apparatus information, if necessary (S203). On the other hand, if the option information is not included in the acquisition request (S202: No), the process continues to S204 in which the operation device 20 performs the rendering process. After S203, the process continues to S204, in which the operation device 20 performs the rendering process. Then, the operation device 20, which performs the rendering process, provides the apparatus configuration image for the application (S204).

Apparatus Configuration Image Updating Process According to First Embodiment

Figure 11:
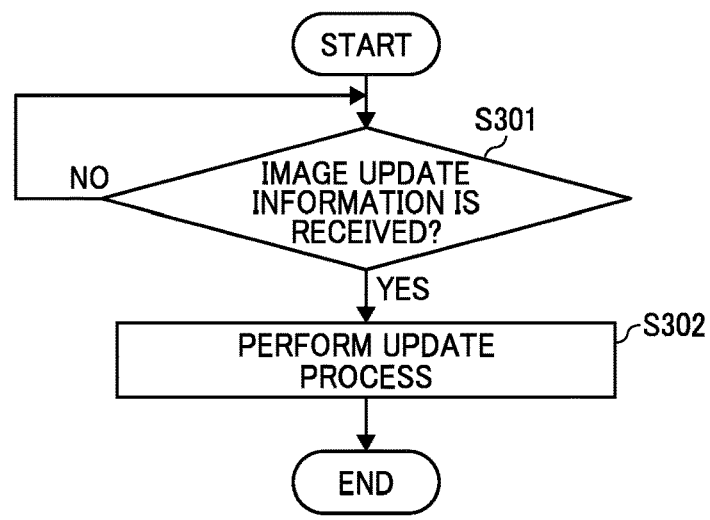
FIG. 11 is a flowchart illustrating an example of a process of updating the apparatus configuration image according to the first embodiment.

A process of updating of the apparatus configuration image is described below with reference to FIG. 11. FIG. 11 is a flowchart illustrating an example of a process of updating the apparatus configuration image according to the first embodiment.

As described in FIG. 11, the apparatus information acquisition unit 120 of the operation device 20 detects whether or not to receive image update information from the image forming apparatus 10 (S301). If detecting the reception of the image update information from the image forming apparatus 10 (S301: Yes), the operation device 20 performs an update process to update the apparatus configuration image (S302). The image update information includes the apparatus configuration image element information and the apparatus information. On the other hand, if the operation device 20 does not receive the image update information (S301: No), the operation device 20 is in a state of waiting for receiving the image update information.

Figure 12A:
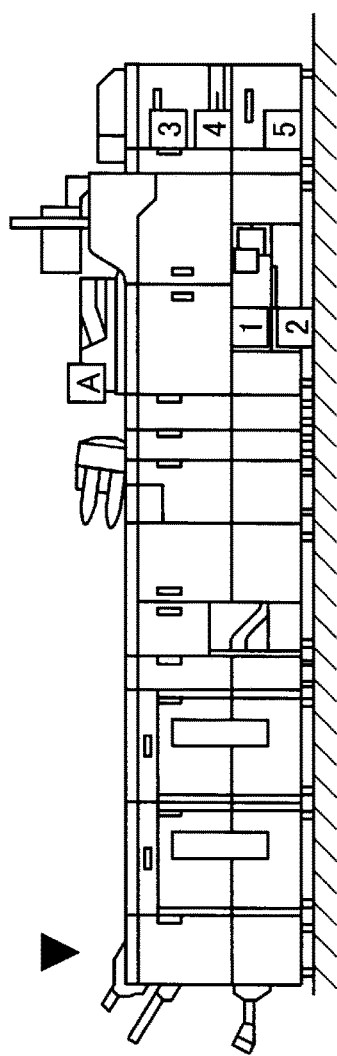
FIG. 12A and FIG. 12B are example illustrations of the apparatus configuration images, respectively, before and after the process of updating the apparatus configuration image is performed, according to the first embodiment.
Figure 12B:
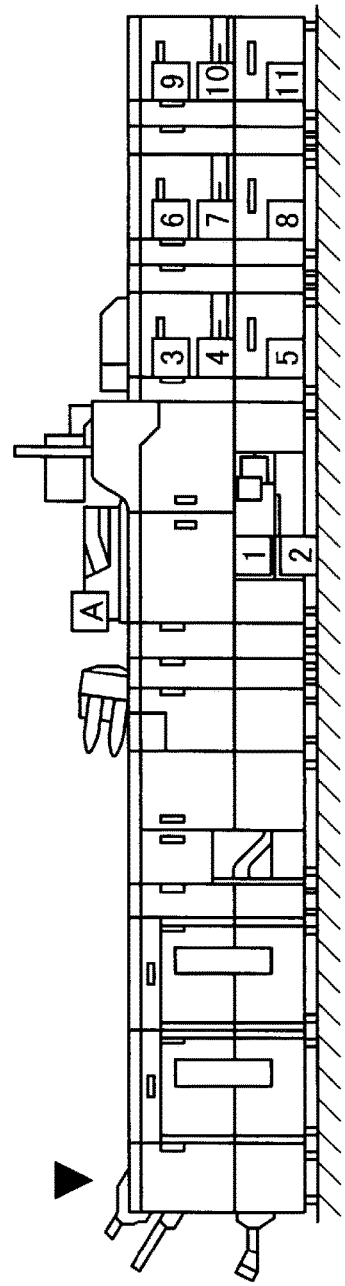

FIG. 12A and FIG. 12B are example illustrations of the apparatus configuration images, respectively, before and after the process of updating the apparatus configuration image is performed, according to the first embodiment. As illustrated in FIG. 12, the image management unit 220 acquires the update information of the apparatus configuration image, and updates to the latest apparatus configuration image. The update information of the apparatus configuration image may be information indicating difference between the previous apparatus configuration image and the current (update) apparatus configuration image. For example, when error occurs in the image forming apparatus 10, when the active part operation state changes, or the like, the image update information is the apparatus information that includes difference information in relation to the sheet feeding information, the sheet ejection information, the error information, or the active part operation state information (active state/inactive state). Additionally, when a part of units is removed from the image forming apparatus 10, the image update information is the unit information that includes information on difference (difference information).

FIG. 13 is an illustration of elements and corresponding units to explain how the elements are managed, according to the first embodiment. As illustrated in FIG. 13, the image forming apparatus 10 manages the apparatus configuration image in units of elements. The image forming apparatus 10, accordingly, may simply send the corresponding elements, in which the difference occurs, to the operation device 20 when the apparatus configuration is changed. Sending simply the difference information, namely a part of the elements, can reduce a communication load.

As described above, the information processing system 1 structures the apparatus configuration image, which is used in the application being executed, in advance, and then provides the apparatus configuration image for the application according to the acquisition request for the apparatus configuration image, resulting in reduction in a processing load of the operation device 20. Additionally, the information processing system 1 provides the apparatus configuration image that is structured in advance, and this prevents that the different apparatus configuration image is displayed for each of different applications. Additionally, the information processing system 1 can display the same apparatus configuration image for the plurality of application at the same time. Additionally, the information processing system 1 provides the apparatus configuration image reflecting whether or not to display the sheet feeding information and the sheet ejection information, and thus displays necessary information for each application. Additionally, the information processing system 1 provides the apparatus configuration image reflecting the size ratio that varies for each application, and thus displays the apparatus configuration image corresponding to the screen layout of each application. Additionally, the information processing system 1 provides the apparatus configuration image reflecting the error display level, and thus achieves displaying necessary errors for each application.

Second Embodiment

In the above description, the embodiment of the disclosure is described using the information processing system 1, however is not intended to be limiting of the present disclosure. Here, (1) configuration and (2) program are described as examples of other embodiments below.

(1) Configuration

The order of steps in the control process, their names, and the information including various types of data and parameters in the description and the drawings can be varied at will except for ones that are specifically described. Additionally, the components of each device are illustrated based on a functional concept, and not necessarily described as it physically is. That is, the specific embodiments of the devices, which are separated from each other or combined together, are not limited to the illustration disclosed, but include configurations in which some of or all of components are physically separated from each other or combined together as desired according to various types of loads or usage conditions.

Figure 14:
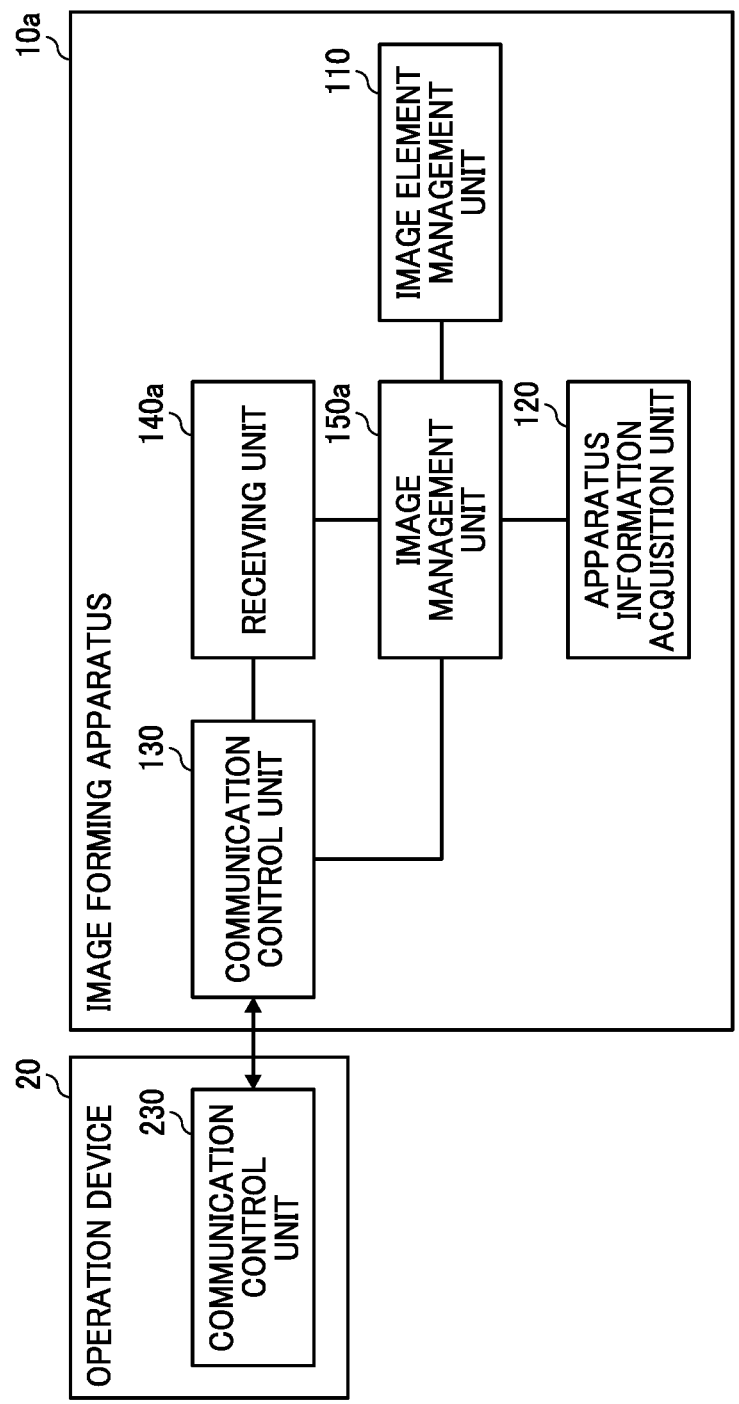
FIG. 14 is a block diagram illustrating an example of a functional configuration of an image processing system according to a second embodiment.

For example, structuring or providing the apparatus configuration image may be performed in the image forming apparatus 10, but not in the operation device 20. FIG. 14 is a block diagram illustrating an example of functional configurations of devices according to a second embodiment. Here, the hardware configuration of each device is the same as the hardware configuration described in the description of the first embodiment. In FIG. 14, the same reference numerals are assigned to components having the same or like functions as the components of the devices according to the first embodiment, and the descriptions thereof are omitted.

As illustrated in FIG. 14, the image forming apparatus 10a includes an image element management unit 110, an apparatus information acquisition unit 120, a communication control unit 130, a receiving unit 140a, and an image management unit 150a. An operation device 20 includes a communication control unit 230. A part of or all of the above-mentioned units may be implemented with software or hardware.

The receiving unit 140a receives the request (acquisition request) to acquire the apparatus configuration image from the operation device 20 via the communication control unit 130, according to an application program executed by the operation device 20. The image management unit 150a provides the apparatus configuration image corresponding to the acquisition request to the operation device 20 via the communication control unit 130 when the receiving unit 140a receives the acquisition request. The image management unit 150a acquires apparatus information from the apparatus information acquisition unit 120 based on the rendering option information included in the acquisition request, if necessary. The image management unit 150a obtains the elements of the apparatus configuration image from the image element management unit 110 and structures the apparatus configuration image in advance. The operation device 20, then, acquires the apparatus configuration image by the application and displays the apparatus configuration image on a control panel 28. Through this, the operation device 20 can reduce a processing load.

(3) Program

A non-transitory recording medium, such as a compact disc read only memory (CD-ROM), a flexible disc (FD), a compact disc-recordable (CD-R), a digital versatile disk (DVD), storing a plurality of instructions (a program) which, when executed by one or more processors, causes the processors to perform a method of processing information is provided as one aspect of the embodiments. Such a program for processing the information executed in the information processing system 1 may be stored in a computer connected to a network such as the internet and provided by downloading via the network.

Additionally, such a program for processing the information executed in the information processing system 1 may be provided or distributed via a network such as the internet. Additionally, such a program for processing the information executed in the information processing system 1 may be implemented in, for example, a read only memory (ROM) to be provided.

The program for processing the information executed in the information processing system 1 has a module configuration including each components described above (receiving unit 210 and the image management unit 220). As an actual hardware configuration, a CPU reads and executes the program for processing the information and then the each components are loaded to a main memory to generate the receiving unit 210 and the image management unit 220 on the main memory.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing system, comprising:
    a first device including a plurality of elements; and
    a second device configured to operate the first device based on user input, the second device including,
        a processor; and
        a memory configured to store a plurality of instructions which, when executed by the processor, cause the processor to:
            store, in the memory, apparatus configuration image element information, the apparatus configuration image element information including at least unit image information and unit connection information, the unit image information indicating locations of image files associated with the plurality of elements, and the unit connection information indicating an order of the image files based on physical positions of corresponding ones of the plurality of elements of the first device relative to other ones of plurality of elements of the first device;
            generate an apparatus configuration image based on the apparatus configuration image element information by downloading the image files based on the locations indicated by the unit image information and arranging the image files in the order indicated by the unit connection information such that the apparatus configuration image indicates a configuration of the physical positions of the plurality of elements of the first device; and
            in response to execution of an application program on the second device, control a display to display an image based on the apparatus configuration image.

2. The information processing system of claim 1, wherein the processor is configured to,
    receive an acquisition request from the application program being executed, and
    provide the apparatus configuration image to the application program being executed in response to the acquisition request.

3. The information processing system of claim 2, wherein when the application program being executed includes a plurality of application programs being executed, the processor is configured to,
    receive a plurality of acquisition requests asynchronously from the plurality of application programs being executed, and
    provide the apparatus configuration image to the plurality of application programs in response to the acquisition requests such that the plurality of application programs receive a same one of the apparatus configuration image.

4. The information processing system of claim 2, wherein when the application program being executed includes a plurality of application programs being executed, the processor is configured to,
    receive a plurality of acquisition requests concurrently from the plurality of application programs being executed, and
    provide the apparatus configuration image to the plurality of application programs in response to the acquisition requests such that the plurality of application programs receive a same one of the apparatus configuration image.

5. The information processing system of claim 2, wherein the acquisition request includes option information on the apparatus configuration image, and
    the processor is configured to provide the apparatus configuration image based on the option information.

6. The information processing system of claim 5, wherein the option information includes an option of whether or not to display sheet feeding information and sheet ejection information of the first device, and
    the processor is configured to provide the apparatus configuration image reflecting the option.

7. The information processing system of claim 5, wherein the option information of the acquisition request includes a size ratio of the apparatus configuration image of the first device, and
    the processor is configured to provide the apparatus configuration image reflecting the size ratio.

8. The information processing system of claim 5, wherein the option information of the acquisition request includes an error display level of the first device, and
    the processor is configured to provide the apparatus configuration image reflecting an error display corresponding to the error display level.

9. The information processing system of claim 1, wherein the processor is configured to update the apparatus configuration image stored in the memory in response to a change in the configuration of the first device.

10. The information processing system of claim 9, wherein the processor is configured to,
    acquire difference information of the first device, the difference information indicating ones of the plurality of elements that are updated, and
    update the apparatus configuration image stored in the memory based on the difference information.

11. The information processing system of claim 1, wherein the processor is configured to,
    in response to a first execution of the application program on the second device,
        generate the apparatus configuration image, and
        store, in the memory, the apparatus configuration image; and
    in response to a second execution of the application program on the second device,
        read, from the memory, the apparatus configuration image, and
        display, via the display, the apparatus configuration image in response to the execution of the application program on the second device such that the processor displays the apparatus configuration image without re-generating same.

12. The information processing system of claim 1, wherein the unit image information further indicates at least a width and a height of a corresponding element in the apparatus configuration image, and the processor is configured to generate the apparatus configuration image by scaling the corresponding element based on the width and the height of the corresponding element.

13. An operation device for operating an external device, the external device including a plurality of elements, the operation device comprising:
a processor; and
a memory configured to store a plurality of instructions which, when executed by the processor, cause the processor to:
store, in the memory, apparatus configuration image element information, the apparatus configuration image element information including at least unit image information and unit connection information, the unit image information indicating locations of image files associated with the plurality of elements, and the unit connection information indicating an order of the image files based on physical positions of corresponding ones of the plurality of elements of the first device relative to other ones of plurality of elements of the external device;
generate an apparatus configuration image based on the apparatus configuration image element information by downloading the image files based on the locations indicated by the unit image information and arranging the image files in the order indicated by the unit connection information such that the apparatus configuration image indicates a configuration of the physical positions of the plurality of elements of the external device; and
in response to execution of an application program on the operation device, control a display to display an image based on the apparatus configuration image.

14. The operation device of claim 13, wherein the processor is configured to,
in response to a first execution of the application program on the external device,
generate the apparatus configuration image, and
store, in the memory, the apparatus configuration image; and
in response to a second execution of the application program on the external device,
read, from the memory, the apparatus configuration image, and
display, via the display, the apparatus configuration image in response to the execution of the application program on the external device such that the processor displays the apparatus configuration image without re-generating same.

15. The operation device of claim 13, wherein the unit image information further indicates at least a width and a height of a corresponding element in the apparatus configuration image, and the processor is configured to generate the apparatus configuration image by scaling the corresponding element based on the width and the height of the corresponding element.

16. An information processing system, comprising:
a first device including a plurality of elements; and
a second device that allows a user to operate the first device via the second device, the second device including,
means for storing, in a memory, apparatus configuration image element information, the apparatus configuration image element information including at least unit image information and unit connection information, the unit image information indicating locations of image files associated with the plurality of elements, and the unit connection information indicating an order of the image files based on physical positions of corresponding ones of the plurality of elements of the first device relative to other ones of plurality of elements of the first device;
means for generating an apparatus configuration image based on the apparatus configuration image element information by downloading the image files based on the locations indicated by the unit image information and arranging the image files in the order indicated by the unit connection information such that the apparatus configuration image indicates a configuration of the physical positions of the plurality of elements of the first device; and
means for controlling a display to display an image based on the apparatus configuration image in response to execution of an application program on the second device.

17. The information processing system of claim 16, wherein the first device is configured to,
in response to a first execution of the application program on the second device,
generate the apparatus configuration image, and
store, in the memory, the apparatus configuration image; and
in response to a second execution of the application program on the second device,
read, from the memory, the apparatus configuration image, and
display, via the display, the apparatus configuration image in response to the execution of the application program on the second device such that the first device displays the apparatus configuration image without re-generating same.

18. The information processing system of claim 16, wherein the unit image information further indicates at least a width and a height of a corresponding element in the apparatus configuration image, and the means for generating is configured to generate the apparatus configuration image by scaling the corresponding element based on the width and the height of the corresponding element.

* * * * *